(12) United States Patent
Kazuma

(10) Patent No.: US 7,917,733 B2
(45) Date of Patent: Mar. 29, 2011

(54) INSTRUCTION CODE COMPRESSION USING INSTRUCTION CODES WITH REUSE FLAGS

(75) Inventor: Shingo Kazuma, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 455 days.

(21) Appl. No.: 12/146,492

(22) Filed: Jun. 26, 2008

(65) Prior Publication Data
US 2009/0024840 A1 Jan. 22, 2009

(30) Foreign Application Priority Data

Jul. 20, 2007 (JP) ................................. 2007-189122

(51) Int. Cl.
*G06F 9/30* (2006.01)
*G06F 9/40* (2006.01)
*G06F 15/00* (2006.01)
(52) U.S. Cl. .......................................... 712/209; 710/68
(58) Field of Classification Search .................. None
See application file for complete search history.

(56) References Cited

U.S. PATENT DOCUMENTS

| 2003/0229709 A1* | 12/2003 | Fraser | 709/231 |
| 2006/0004997 A1* | 1/2006 | Mykland | 712/244 |
| 2007/0204133 A1* | 8/2007 | Taniuchi | 712/209 |

FOREIGN PATENT DOCUMENTS

JP 2004259234 9/2004

OTHER PUBLICATIONS

Debray et al.; Compiler Techniques for Code Compression; 2000.*
Wang et al.; Code size reduction by compressing repeated instruction sequences; Mar. 2007; Springer Science+Business Media, LLC.*
Cooper et al.; Enhanced Code Compression for Embedded RISC Processors; 1999.*
Ernst et al.; Code Compression; 1997; ACM PLDI '97.*
Fraser; An Instruction for Direct Interpretation of LZ77-compressed Programs; Sep. 2002.*
Lin et al.; Code Compression by register operand dependency; Dec. 2003; Journal of Systems and Software 72, pp. 295-304.*

* cited by examiner

*Primary Examiner* — Eddie P Chan
*Assistant Examiner* — Corey Faherty
(74) *Attorney, Agent, or Firm* — Volentine & Whitt, P.L.L.C.

(57) ABSTRACT

An instruction code compression method and an instruction fetch circuit which are capable of reducing both the number of fetches and program codes. A reuse flag is provided in an upper bit group including operational codes, and a lower bit group including operands and having the same number of bits as the upper bit group. When 2N+1 (N is an integer of 1 or more) instruction codes having the same upper bit group continues in a series of instruction codes, respective reuse flags of the lower bit group of a 2n-th (n is an integer of 1 or more and N or less) instruction code and a (2n+1)-th instruction code in the series of instruction codes are set to "1", and the lower bit groups of the 2n-th and (2n+1)-th instruction codes are integreted into one compressed instruction code.

12 Claims, 14 Drawing Sheets

BASIC FORMAT 1

COMPRESSION FORMAT 2

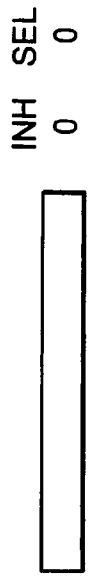
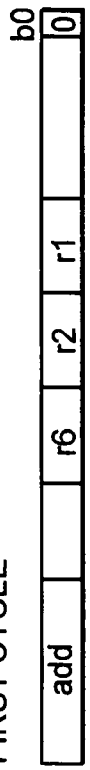
FIG. 3A
FIG. 3B
FIG. 3C

| FC | R | B | U |
|---|---|---|---|
| 000 | 1 | 0 | 0 |
| 001 | 1 | 1 | 0 |
| 010 | 1 | 2 | 0 |
| 011 | 0 | 0 | 0 |
| 100 | 0 | 0 | 1 |
| 101 | 0 | 1 | 1 |
| 110 | 0 | 2 | 1 |
| 111 | 0 | 0 | 0 |

| FC | R | S | U |
|------|---|---|---|
| 0000 | 1 | 0 | 0 |
| 0001 | 1 | 1 | 0 |
| 0010 | 1 | 2 | 0 |
| 0011 | 0 | 0 | 0 |
| 0100 | 0 | 0 | 1 |
| 0101 | 0 | 1 | 1 |
| 0110 | 0 | 2 | 1 |
| 0111 | 0 | 0 | 0 |

|     |          | OPC  | OP0 | OP1 | OP2 | OP3 | OP4 | FC   |
|-----|----------|------|-----|-----|-----|-----|-----|------|
| ldpi r1, r4, 0x04 | | ldpi |     | r4  | 0x0 | 0x4 | r1  | 0101 |

DELETE

| ldpi r2, r4, 0x04 | ldpi |  | r4 | 0x0 | 0x4 | r2 | 0001 |

DELETE

| ldpi r3, r5, 0x04 | ldpi |  | r5 | 0x0 | 0x4 | r3 | 0001 |
| mult r7, r1, r3   | mult |  | r7 | r3  | r1  |    | 0100 |
| stpi r7, r6, 0x04 | stpi |  | r6 | 0x0 | 0x4 | r1 | 0110 |

DELETE     DELETE

| mulb r7, r2, r3 | mulb |  | r7 | r3 | r2 |  | 0000 |

DELETE

| stpi r7, r6, 0x04 | stpi |  | r6 | 0x0 | 0x4 | r7 | 0010 |

⇩

| ldpi |    |    |      | r4 | 0x  | 0x4 | r1 | 0101 |
|      |    |    |      | r4 |     | 0x4 | r2 | 0001 |
|      |    |    |      | r5 |     | 0x4 | r3 | 0001 |
| mult |    |    |      | r7 | r3  | r1  |    | 0100 |
| stpi |    |    |      | r6 | 0x0 | 0x4 | r7 | 0110 |
| mulb |    |    |      |    |     | r2  |    | 0000 |
|      |    |    |      |    | 0x0 | 0x4 | r7 | 0010 |

⇩

| ldpi |     |    |      | r4 | 0x0 | 0x4 | r1 | 0101 |
| r5   | 0x4 | r3 | 0001 | r4 |     | 0x4 | r2 | 0001 |
| mult |     |    |      | r7 | r3  | r1  |    | 0100 |
| stpi |     |    |      | r6 | 0x0 | 0x4 | r7 | 0110 |
| 0x0  | 0x4 | r7 | 0010 | mulb |   | r2  |    | 0000 |

FIG. 13

INSTRUCTION CODE COMPRESSION USING INSTRUCTION CODES WITH REUSE FLAGS

BACKGROUND OF THE INVENTION

1. Field of the Invention

The present invention relates to an instruction code compression method in a computer, and an instruction fetch circuit which is capable of reading an instruction code after compression and supplying the read instruction code to an instruction decoder.

2. Description of the Related Art

With the recent increase in scale of system software, there are many cases wherein the area of a memory storing software is larger than that of a CPU (Central Processing Unit). Under such a situation, it is important to reduce power consumption of the memory, in addition to limiting power consumption of the CPU. In particular, as access to a memory storing instruction codes frequently occurs during execution of applications/programs, it is desirable to reduce the number of accesses.

In a conventional CPU, it is common that an instruction code fetched from a memory is directly decoded by an instruction decoder, or is decoded by the instruction decoder after being stored in an instruction register for subsequent execution. In this case, since the instruction code used once in the instruction register is always overwritten by a next instruction code, a new instruction code is required to be read from the memory, and accordingly, power consumption by an access to the memory can be reduced. In addition, since power consumption required for one access is increased if the size of memory is increased, there arises a problem when increasing the size of software.

Japanese Patent Application Publication No. 2004-259234 discloses a program code compression/decompression method in which program codes are compressed and stored in a memory by commonization of a condition code part of "regular execution" in an instruction execution condition designating part of an instruction code for RISC (Reduced Instruction Set Computer), and for execution. The compressed program codes are read from the memory and are deployed. The program code compression/decompression method disclosed in Japanese Patent Application Publication No. 2004-259234 can reduce required memory capacity by compressing the program codes. However, when the compressed program codes are read and deployed into the original instruction codes, since the number of accesses when a head instruction is read for each block of the compressed program codes increases by one, problems such as increased execution time for reading and increased power consumption become apparent. In addition, since only the upper 4 bits of program codes can be compressed, another problem is that reduction in memory capacity of up to only about 10% at the most can be realized.

SUMMARY OF THE INVENTION

In order to solve the above problems it is an object of the present invention to provide an instruction code compression method and an instruction fetch circuit which is capable of reducing both the number of fetches and program codes.

To achieve this object, according to the present invention, there is provided an instruction code compression method for reducing the number of instruction codes in a computer, including an operation circuit that sequentially decodes and executes instruction codes composed of an upper bit group including operational codes, and a lower bit group including operands and having the same number of bits as the upper bit group. Reuse flags are provided in the lower bit group. When 2N+1 (N is an integer of 1 or more) instruction codes having the same upper bit group continues in a series of instruction codes, respective reuse flags of the lower bit group of a 2n-th (n is an integer of 1 or more and N or less) instruction code and a (2n+1)-th instruction code in the series of instruction codes are set, and the lower bit groups of the 2n-th and (2n+1)-th instruction codes are integrated into one compressed instruction code.

According to another aspect of the invention, there is provided an instruction fetch circuit that sequentially reads instruction codes and provides the read instruction codes to an instruction decoder, the instruction fetch circuit including an instruction register that holds the basic instruction code or the compression instruction code read from a memory; a first selector that selects an upper bit group or a lower bit group of the instruction register according to a select signal and provides the selected upper bit group or lower bit group, as a lower bit group of the instruction code, to the instruction decoder; an instruction buffer that holds the upper bit group of the instruction register; a second selector that selects the content of instruction buffer when a reuse flag of the lower bit group selected by the first selector and provided to the instruction decoder is set, selects the upper bit group of the instruction register when the reuse flag is not set, and provides the selected upper bit group, as an upper bit group of the instruction code, to the instruction decoder; and a select signal generating unit that generates the select signal to alternately select the upper bit group and the lower bit group of the instruction register when a reuse flag of the lower bit group selected by the first selector and provided to the instruction decoder is set.

Still another aspect of the invention involves increasing the number of instruction buffers that hold used operational codes and so on, for the purpose of reducing the program size and the number of instruction fetches. Yet still another aspect of the invention involves changing the arrangement of operands and so on in addition to increasing the number of instruction buffers that hold used operational codes and so on, for the purpose of further reducing the program size and the number of instruction fetches.

In the present invention, a reuse flag is provided in a portion of an instruction code, and when the same operational codes are consecutive, the reuse flag is set to exclude the operational codes, thereby allowing two instruction codes to be changed to one compressed instruction code. This makes it possible to reduce the number of instruction codes composing a series of programs. In addition, the instruction fetch circuit has an instruction buffer to hold operational codes of the preceding instruction code. If a reuse flag of a next instruction code is set, it is possible to reproduce an original instruction code by reusing the content of the instruction buffer. Accordingly, it is possible to obtain such an advantageous effect that a reduction in the size of program codes stored in a memory as well as reduction in the number of fetches of instruction codes read from the memory can be achieved.

BRIEF DESCRIPTION OF THE DRAWINGS

The above and other features of the present invention will become readily apparent from the detailed description that follows with reference to the accompanying drawings, in which:

FIGS. 3A-3C are explanatory views for explaining operation of the instruction fetch circuit shown in FIG. 2;

FIG. 13 is an explanatory view for explaining an example of application of an instruction code in accordance with the sixth embodiment.

DESCRIPTION OF THE PREFERRED EMBODIMENTS

The above and other objects and features of the invention will now become more fully apparent as described by way of preferred embodiments, in conjunction with the accompanying drawings which are provided only for the purpose of illustration and which are not intended to limit the scope of the invention.

Figure 1A:
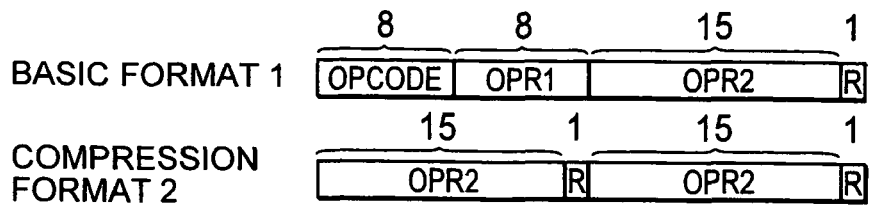
FIGS. 1A-1C are explanatory views of an instruction code format according to a first embodiment of the present invention.

FIGS. 1A-1D are explanatory views of an instruction code format according to a first embodiment. As shown in FIG. 1A, instruction codes of the first embodiment include a basic instruction code of a basic format 1 and a compression format 2. The basic format 1 corresponds to an instruction code for general RISC (Reduced Instruction Set Computer). In the basic format 1 as shown in FIG. 1A, one instruction consists of one word of 32 bits. Of the upper 16 bits of the 32 bits, 8 bits are assigned to an operational code OPCODE, and the remaining 8 bits are assigned to an operand OPR1 and so on. The least significant bit of lower 16 bits is assigned to a reuse flag R, and the remaining 15 bits are assigned to an operand OPR2 and so on.

The reuse flag R represents the content of the upper 16 bits of the current instruction code, and indicates whether or not the upper 16 bits of a previous instruction code is to be reused, that is, whether or not the upper 16 bits of the current instruction code are equal to the upper 16 bits of the previous instruction code. If the reuse flag R is "0", it indicates that the previous instruction code is not to be reused. If the reuse flag R is "1", it indicates use of the previous instruction code. For the basic format 1, the reuse flag R is "0".

On the other hand, in the compression format 2 shown in FIG. 1A, 16 bits of an upper bit group and 16 bits of a lower bit group are each assigned with a reuse flag R as the least significant bit and the operand OPR2 of the remaining 15 bits and so on. For the compression format 2, since the upper 16 bits of the previous instruction code is reused, the reuse flags R of the upper bit group and the lower bit group are all "1".

Figure 1B:
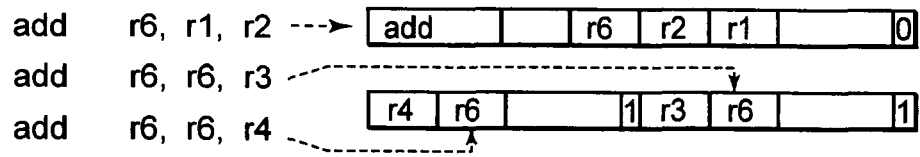
Figure 1C:
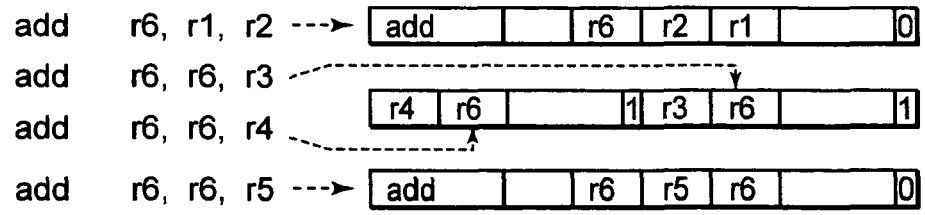
Figure 1D:
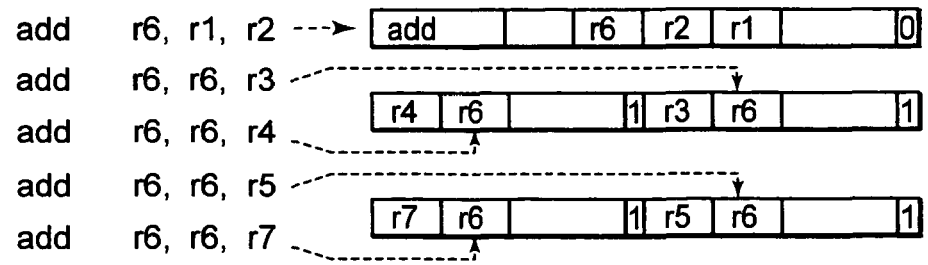

FIGS. 1B to 1D show examples of compression of the instruction code by the basic instruction code of FIG. 1A, in which the left side shows an instruction code of an assembly level before compression, which is represented by a mnemonic code, and the right side shows an instruction code after compression.

In the first example shown in FIG. 1B, three consecutive instructions add having the same upper 16 bits are included. Thus, since the upper 16 bits of the first instruction add can be directly used for the second and third instructions add, their reuse flags R are set to "1" and the upper 16 bits are deleted. Accordingly, the first instruction code after compression corresponds to the first instruction add and uses the basic format 1 of 32 bits having the reuse flag R set to "0". The second instruction code after compression uses the compression format 2 of 32 bits including the lower 16 bits of the second instruction code before compression, and the lower 16 bits of the third instruction code before compression. The lower 16 bits in the compression format 2 correspond to the lower 16 bits of the second instruction code before compression, and the upper 16 bits in the compression format 2 correspond to the lower 16 bits of the third instruction code before compression. As a result, the three instruction codes can be compressed into two instruction codes.

In the second example shown in FIG. 1C, four consecutive instructions add having the same upper 16 bits are included. In this case, although the upper 16 bits of the first instruction add can be directly used for the second to fourth instructions add, since the compression is carried out in the unit of two instructions, there exists no instruction paired with the second instruction. Thus, although the second and third instructions add can be compressed into the instruction code of the compression format 2 in the same way as in the first example shown in FIG. 1B, the fourth instruction add has the basic format 1 like the first instruction. As a result, the four instruction codes can be compressed into three instruction codes.

In the third example shown in FIG. 1D, five consecutive instructions add having the same upper 16 bits are included. In this case, the upper 16 bits of the first instruction add can be directly used for the second to fifth instructions. Accordingly, the second and third instructions and the fourth and fifth instructions can be compressed into the instruction code of the compression format 2. As a result, the five instruction codes can be compressed into three instruction codes.

Although the compression method has been described above with reference to FIGS. 1B-1D respectively for three, four and five consecutive instructions, the compression method can be generalized for 2N+1 (N is an integer of 1 or more) instructions add having the same upper bit group (not being limited to 16 bits) in a series of instruction codes. In this case, reuse flags R are provided to a lower bit group consisting of the same number of bits as an upper bit group, reuse flags R of lower bit groups of the 2n-th (n is an integer of 1 or more and N or less) instruction code and the subsequent (2n+1)-th instruction code are set to "1", and the lower bit groups of the 2n-th and (2n+1)-th instruction codes may be combined to have one compression format 2. In addition, the first instruction code has the basic format 1 with the reuse flag R set to "0".

Figure 2:
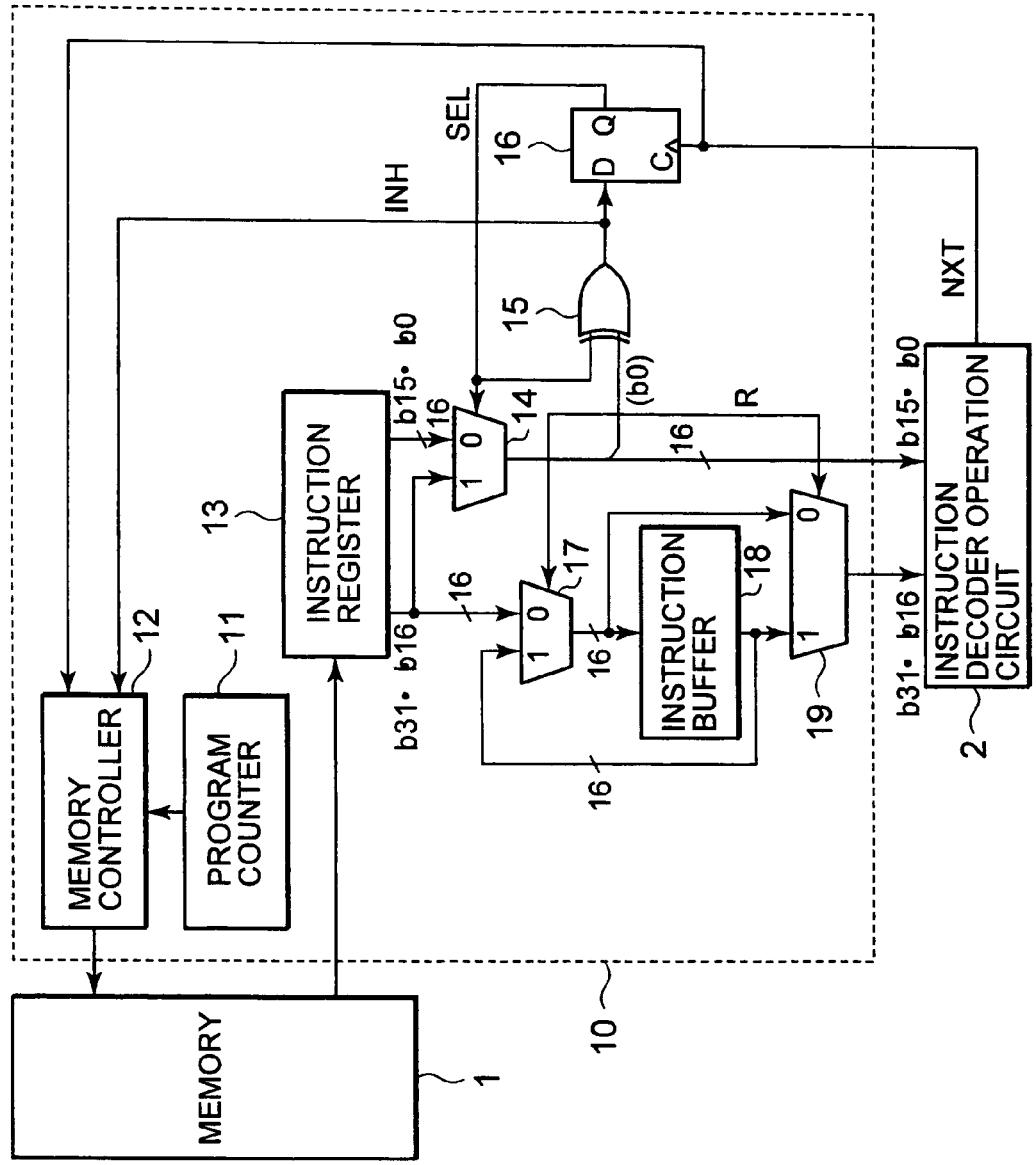
FIG. 2 is a view showing a configuration of an instruction fetch circuit corresponding to an instruction code in accordance with the first embodiment.

FIG. 2 is a view showing a configuration of an instruction fetch circuit corresponding to the instruction code in accordance with the first embodiment. An instruction fetch circuit 10 reads an instruction code compressed by the compression method of FIG. 1 and stored in a memory 1, and converts the compressed instruction code that is in the compression format 2 into the instruction code of the basic format 1. The compressed instruction code as converted into the instruction code of the basic format is provided to instruction decoder operation circuit 2.

The instruction fetch circuit 10 a shown in FIG. 2 includes a memory controller 12 for reading an instruction code from the memory 1 according to a read address set in a program counter 11. Upon receiving a timing signal NXT from the instruction decoder operation circuit 2 commanding a next instruction read, the memory controller 12 reads the read address set in the program counter 11, unless a read inhibition signal INH is received by the memory controller 12. If the read inhibition signal INH is received by memory controller 12 when the timing signal NXT is received by the memory controller 12, the reading operation of the memory controller 12 is not performed.

The instruction code read from the memory 1 is provided to the instruction register 13. The instruction register 13 stores an instruction code of 32 bits. The upper 16 bits and the lower 16 bits as stored in instruction register 13 are respectively provided to input terminals 1 and 0 of selector 14. Selector 14 selects the input terminal 0 when a select signal SEL has a logical value "0", selects the input terminal 1 when the select signal SEL has a logical value "1", and outputs the signal provided to the selected input terminal.

An output signal of the selector 14 is directly provided, as lower 16 bits (b15 to b0) of the instruction code, to the instruction decoder operation circuit 2. The least significant bit b0 output from the selector 14 is provided as a reuse flag R to one input of exclusive OR gate (EXOR) 15. The read inhibition signal INH is output from EXOR gate 15 to the memory controller 12 and a data terminal D of a flip-flop (FF) 16.

FF 16 holds the read inhibition signal INH at the rising of the timing signal NXT which is provided from the instruction decoder operation circuit 2 to a clock terminal C of the FF 16, and outputs the held content as a select signal SEL. The select signal SEL is provided to the selector 14 and the other input of EXOR gate 15. A loop circuit including the EXOR gate 15 and FF 16 is thus provided, and when the reuse flag R is "1", a toggling operation occurs at every rising of the timing signal NXT to alternate the select signal SEL between "0" and "1".

The upper 16 bits stored in the instruction register 13 are also provided to an input terminal 0 of a selector 17. The selector 17 selects the input terminal 0 when the reuse flag R is "0", selects the input terminal 1 when the reuse flag R is "1", and outputs a signal at the selected input terminal as an output signal. An output signal of the selector 17 is written into an instruction buffer 18 and is provided to an input terminal 0 of a selector 19.

An output signal of the instruction buffer 18 is provided to the input terminal 1 of the selector 17 and an input terminal 1 of selector 19. The selector 19 selects input terminal 0 when the reuse flag R is "0", selects input terminal 1 when the reuse flag R is "1", and outputs a signal at the selected input terminal as an output signal. An output signal of the selector 19 is provided to the instruction decoder operation circuit 2 as the upper 16 bits (b31 to b16) of the instruction code.

FIGS. 3A-3B are explanatory views for explaining operation of the instruction fetch circuit 10 shown in FIG. 2, including an operation to fetch from memory 1 the instruction code compressed in the first example described with respect to FIG. 1B, and to provide the fetched instruction code to instruction decoder operation circuit 2. Hereinafter, the operation of FIG. 2 will be described with reference to FIGS. 3A-3C.

(1) Operation During First Cycle

First, as described with respect to FIG. 3A, the instruction register 13 and the FF 16 are reset by a reset signal (not shown), and the select signal SEL is set to "0". In addition, the bit b0 (reuse flag R) output from the selector 14 is "0", and the read inhibition signal output from EXOR gate 15 is "0".

Here, upon receiving the timing signal NXT from the instruction decoder operation circuit 2, the memory controller 12 fetches the first instruction code of the basic format 1 from the memory 1. The fetched instruction code is stored in the instruction register 13.

At this time, since the select signal SEL is "0", the selector 14 selects the lower 16 bits of the instruction register 13, and outputs them as the lower bits b15 to b0 of the instruction code to the instruction decoder operation circuit 2. The least significant bit b0 of the lower bits selected by the selector 14 is provided as the reuse flag R to EXOR gate 15 and the selectors 17 and 19. Here, since the reuse flag R is "0", the read inhibition signal INH output from EXOR gate 15 remains unchanged, that is "0".

The selector 17 selects the upper 16 bits of the instruction register 13, and writes them into the instruction buffer 18. The selector 19 selects the output signal of the selector 17 and outputs the signal to the instruction decoder operation circuit 2 as the upper bits b31 to b16 of the instruction code.

Accordingly, the first instruction code of the basic format 1 stored in the instruction register 13 is output to the instruction decoder operation circuit 2. The instruction decoder operation circuit 2 decodes and executes the first instruction code of the basic format 1. After completion of the execution, the instruction decoder operation circuit 2 outputs the timing signal NXT to require a next instruction code.

(2) Operation During Second Cycle

Since the read inhibition signal INH at the end of the first cycle is "0", the memory controller 12 fetches the second instruction code of the compression format 2 from the memory 1 according to the timing signal NXT. The fetched instruction code is stored in the instruction register 13, as indicated in FIG. 3B.

At this time, since the select signal SEL is "0", the selector 14 selects the lower 16 bits of the instruction register 13 and outputs them to the instruction decoder operation circuit 2 as the lower bits b15 to b0 of the instruction code. The least significant bit b0 of the lower bits selected by the selector 14 is provided as the reuse flag R to EXOR gate 15 and the selectors 17 and 19.

At this time, since the reuse flag R is "1" in the instruction code of the compression format 2, the read inhibition signal INH output from EXOR gate 15 becomes "1". Also, since reuse flag R is "1", selector 17 selects the output signal of the instruction buffer 18, and writes it in the instruction buffer 18. The selector 19 selects the output signal of the instruction buffer 18. The instruction buffer 18 thus holds the upper 16 bits of the first instruction code of the basic format 1 read during the first cycle, and outputs the held content of the instruction buffer 18 as the upper bits b31 to b16 of the instruction code to the instruction decoder operation circuit 2.

Accordingly, the upper 16 bits of the first instruction code of the basic format 1 held in the instruction buffer 18 and the lower 16 bits of the instruction code of the compression format 2 stored in the instruction register 13 are output as the instruction code of the basic format to the instruction decoder operation circuit 2. The instruction decoder operation circuit 2 decodes and executes the instruction code of the basic format provided from the instruction fetch circuit 10. After completion of "the execution," the instruction decoder operation circuit 2 outputs the timing signal NXT to require a next instruction code.

(3) Operation During Third Cycle

Since the read inhibition signal INH is set to "1" by the read of the instruction code of the compression format 2 during the second cycle, the memory controller 12 does not fetch any instruction code from the memory 1 even when the timing signal NXT is provided thereto. Thus, the content of the instruction register 13 remains unchanged, as indicated in FIG. 3C. In the meantime, at a timing of the rising of the timing signal NXT, the read inhibition signal INH is held in FF 16, and accordingly the select signal SEL becomes "1".

Accordingly, the selector 14 selects the upper 16 bits of the instruction register 13 and outputs them as the lower bits b15 to b0 of the instruction code to the instruction decoder operation circuit 2. The least significant bit b0 of the upper bits selected by the selector 14 is provided as the reuse flag R to EXOR gate 15 and the selectors 17 and 19.

At this time, in the instruction code of the compression format 2, since the reuse flag R is "1", the read inhibition signal INH output from EXOR gate 15 becomes "0". Also, since the reuse flag is "1", selector 17 selects the output signal of the instruction buffer 18 and writes it in the instruction buffer 18. The selector 19 selects the output signal of the instruction buffer 18. The instruction buffer 18 thus holds the upper 16 bits of the first instruction code of the basic format 1 read at the first cycle, and outputs the content of the instruction buffer 18 as the upper bits b31 to b16 of the instruction code to the instruction decoder operation circuit 2.

Accordingly, the upper 16 bits of the first instruction code of the basic format 1 held in the instruction buffer 18 and the upper 16 bits of the instruction code of the compression format 2 stored in the instruction register 13 are output as the instruction code of the basic format, to the instruction decoder operation circuit 2. The instruction decoder operation circuit 2 decodes and executes the instruction code of the basic format provided from the instruction fetch circuit 10. After completion of the execution, the instruction decoder operation circuit 2 outputs the timing signal NXT to require a next instruction code.

At this point of time, since the read inhibition signal INH is "0", the memory controller 12 performs a third read operation from the memory 1, and accordingly a fetched instruction code is stored in the instruction register 13. Here, if the third fetched instruction code has the basic format as shown in the second example described with respect to FIG. 1C, the above Operation During First Cycle (1) is performed. If the third fetched instruction code has the compression format as shown in the third example described with respect to FIG. 1D, the above Operation During Second Cycle (2) and Operation During Third Cycle (3) are repeated.

As described above, in the instruction code format of the first embodiment, when three or more instruction codes having the same upper 16 bits are consecutive, these instruction codes are integrated into one compression format by combining the lower 16 bits of the second and subsequent consecutive instruction codes into the unit of two. Accordingly, it is possible to reduce program codes stored in memory 1, and also to reduce the number of fetches to read the program codes.

Figure 4A:
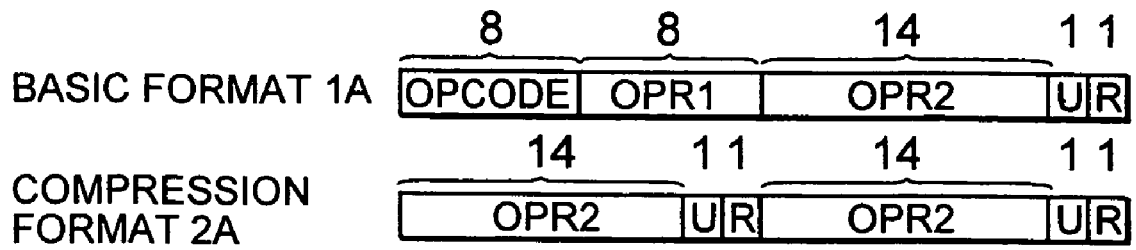
FIGS. 4A and 4B are explanatory views of an instruction code format according to a second embodiment of the present invention.
Figure 4B:
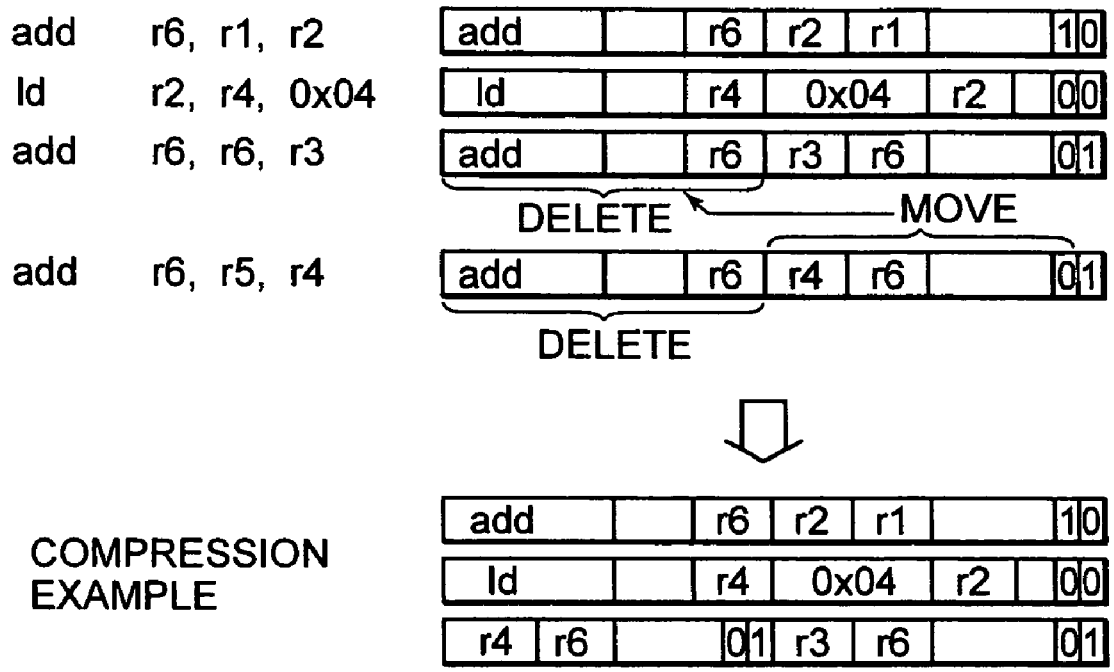

FIGS. 4A and 4B are explanatory views of an instruction code format according to a second embodiment of the present invention. FIG. 4A shows a basic instruction code, and FIG. 4B shows an example of compression. In FIGS. 4A and 4B, the same components as in FIGS. 1A-1D are denoted by the same reference numerals.

While the instruction code format of the first embodiment is for three or more instructions add having the same upper 16 bits, an instruction code before compression in FIG. 4B includes three consecutive instructions add having the same upper 16 bits and a different instruction 1d lying between the first instruction add and the third and fourth consecutive instructions add. Accordingly, the instruction code format of the first embodiment can not be employed. Even for such a case, the second embodiment allows compression of the third and fourth consecutive instructions add.

As shown in FIG. 4A, in the second embodiment an instruction code includes a basic instruction code of a basic format 1A and a compression format 2A. In the basic format 1A, one instruction consists of one word of 32 bits. Of the upper 16 bits of the 32 bits, 8 bits are assigned to an operational code OPCODE and the remaining 8 bits are assigned to an operand OPR1 and so on. The lower 2 bits of the lower 16 bits are assigned to a reuse flag R and an update flag U, respectively, and the remaining 14 bits are assigned to an operand OPR2 and so on.

The reuse flag R is used for the similar purpose as the reuse flag R in the first embodiment. In other words, the reuse flag R indicates whether or not the upper 16 bits of a previous instruction code are to be reused for the upper 16 bits of a current instruction code, that is whether or not the upper 16 bits of the current instruction code are equal to the upper 16 bits of the previous instruction code. If the reuse flag R is "0", it indicates that the previous instruction code is not used. If the reuse flag R is "1", it indicates use of the previous instruction code. For the basic format 1A, the reuse flag R is "0".

The update flag U indicates whether or not the content of the upper 16 bits of the instruction code is to be conserved or saved, to be used as the upper 16 bits of an instruction code of the compression format 2A to be executed later. If the update flag U is "1", it indicates that the content is to be conserved or saved. If the update flag U is "0", it indicates that the content is not to be conserved or saved.

On the other hand, in the compression format 2A, 16 bits of an upper bit group and 16 bits of a lower bit group are each assigned with the reuse flag R and update flag U, and an operand OPR2 of the remaining 14 bits and so on. For the compression format 2A, since the upper 16 bits of the previous instruction code is reused, the reuse flags R of the upper bit group and the lower bit group are all "1" and the update flag U is "0".

As an example of a method of compressing an instruction code using the basic instruction code of FIG. 4A, for the first instruction add, if the content of the upper 16 bits of the instruction code is to be reused later, the update flag U is set to "1" for conservation of the content, as shown in FIG. 4B. On the other hand, for the second instruction 1d, if the content of the upper 16 bits of the instruction code is not to be reused later, the update flag U is set to "0" since there is no need of conservation of the content. The reuse flags R of these instruction codes are all "0".

Since the third and fourth instructions add reuse the content of the upper 16 bits of the instruction code of the first instruction add, the reuse flags R are all "1". In addition, the compression format 2A of 32 bits including the lower 16 bits of the third instruction code before compression and the lower 16 bits of the fourth instruction code before compression are used. The lower 16 bits in the compression format 2A correspond to the lower 16 bits of the third instruction code before compression, and the upper 16 bits in the compression format 2A correspond to the lower 16 bits of the fourth instruction code before compression. As a result, the four instruction codes can be compressed into three instruction codes.

Figure 5:
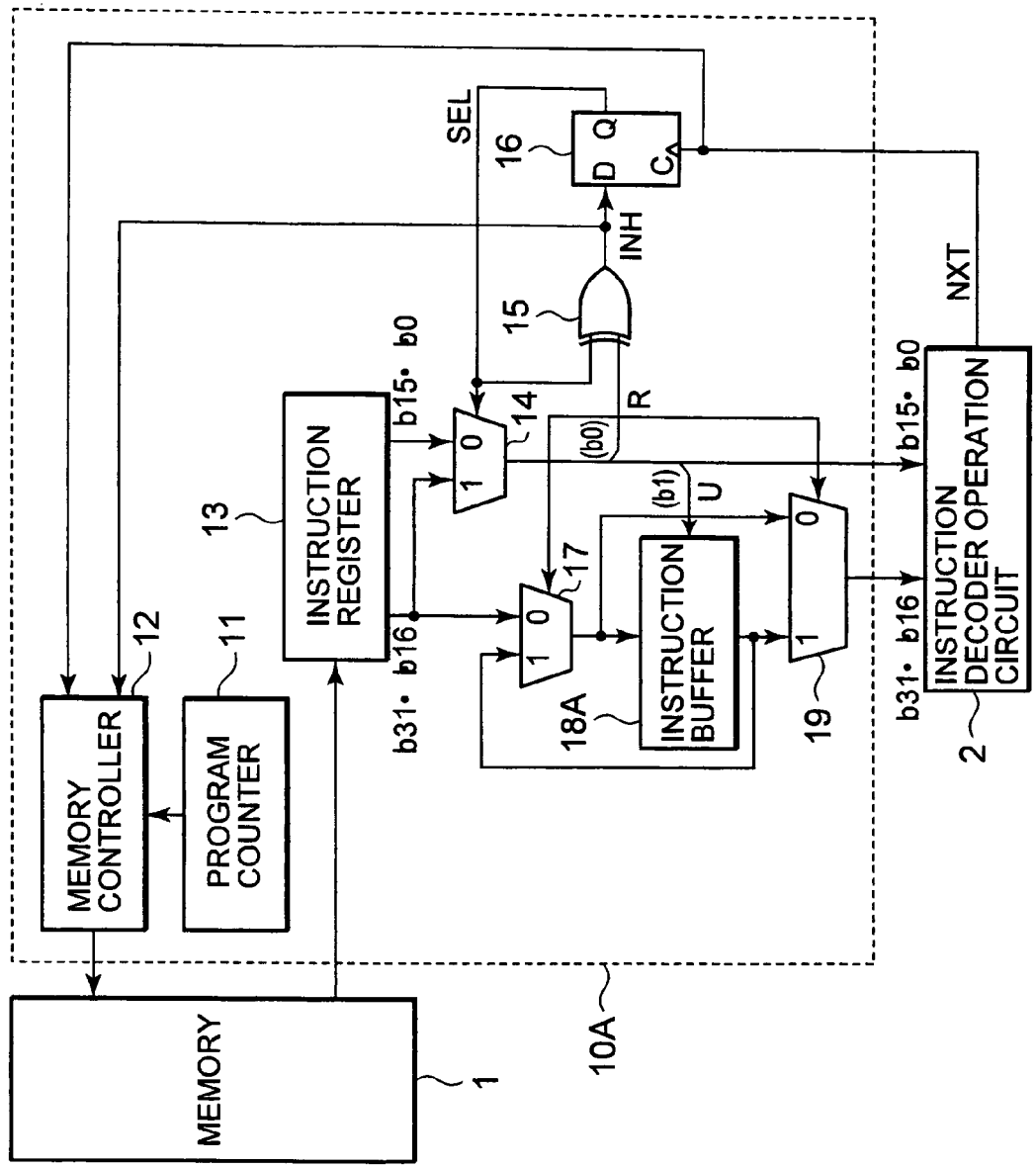
FIG. 5 is a view showing a configuration of an instruction fetch circuit corresponding to an instruction code in accordance with the second embodiment.

FIG. 5 is a view showing a configuration of an instruction fetch circuit corresponding to the instruction code in accordance with the second embodiment. In this figure, the same components as FIG. 2 are denoted by the same reference numerals. The instruction fetch circuit 10A reads an instruction code that is compressed by the compression method of FIG. 4 and that has been stored in memory 1. The instruction fetch circuit 10A converts the instruction code of the compression format 2A to the instruction code of the basic format 1A, and provides the converted instruction code of the basic format 1A to instruction decoder operation circuit 2.

Instruction fetch circuit 10A is different from instruction fetch circuit 10 shown in FIG. 2 in that an instruction buffer 18A is included instead of buffer 18 in FIG. 2. Instruction buffer 18A is controlled as to whether or not a signal is held therein according to the update flag U (bit b1) of the lower 16 bits selected by the selector 14. That is to say, if the update flag U is "1", an output signal of the selector 17 is held in the instruction buffer 18A, and the content held in the instruction buffer 18A is updated. If the update flag U is "0", the output signal of the selector 17 is not held in the instruction buffer 18A, and accordingly the content held in the instruction buffer 18A is not updated. The remaining configuration of instruction fetch circuit 10A is identical with that shown in FIG. 2.

Next, a fetch operation of the instruction code after compression of FIG. 4B by the instruction fetch circuit 10A will be described. The first instruction add of the basic format 1A read by fetch during a first cycle is stored in the instruction register 13. Since the reuse flag. R of this instruction add is "0", the lower 16 bits of the instruction add stored in the instruction register 13 are selected by the selector 14 and provided to the instruction decoder operation circuit 2. The upper 16 bits of the instruction add stored in the instruction register 13 are selected by the selectors 17 and 19, and provided to the instruction decoder operation circuit 2. At this time, since the update flag U of the instruction add is "1", the upper 16 bits of the instruction add stored in the instruction register 13 are stored in the instruction buffer 18A.

The second instruction 1d of the basic format 1A read by fetch during a second cycle is stored in the instruction register 13. Since the reuse flag R of this instruction id is "0", the lower 16 bits of the instruction 1d are provided to the instruction decoder operation circuit 2, like the first instruction add. At this time, since the update flag U of the instruction 1d is "0", the content of the instruction register 13 is not updated. In other words, the upper 16 bits of the first instruction add are stored in the instruction buffer 18A.

The third instruction code of the compression format 2A read by fetch during a third cycle is stored in the instruction register 13. Since the reuse flag R of this instruction code is "1", the read inhibition signal INH becomes "1". An output signal of the instruction buffer 18A is selected by the selector 19, and the upper 16 bits of the first instruction add stored in the instruction buffer 18A are provided to the instruction decoder operation circuit 2 along with the lower 16 bits of the third instruction code of the compression format 2A.

In fetch during a fourth cycle, since the read inhibition signal INH is "1", a read operation from the memory 1 by the memory controller 12 is not performed. Instead, the upper 16 bits of the instruction register 13 are selected by the selector 14 and are provided to the instruction decoder operation circuit 2 along with the upper 16 bits of the first instruction add stored in the instruction buffer 18A.

As will be understood from the foregoing, in the instruction code format of the second embodiment, when three or more instruction codes having the same upper 16 bits are consecutive, the upper 16 bits are held in the instruction buffer 18A by setting the update flag U of the first instruction code, and these instruction codes are integrated into one compression format by combining the lower 16 bits of the second and subsequent consecutive instruction codes into the unit of two. Hence, even when a different instruction code is present between consecutive same instruction codes, it is possible to enjoy such a merit that a reduction in the program codes stored in the memory 1 as well as that in the number of fetches to read the program codes can be achieved.

Figures 6A, 6B, 6C:
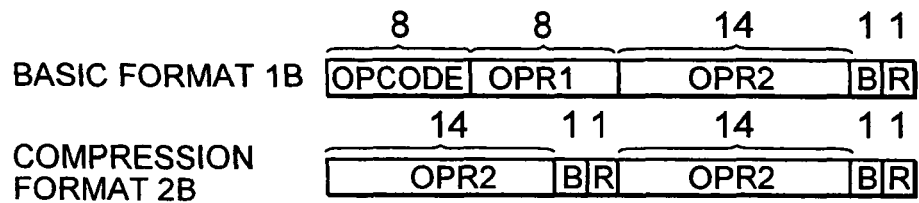
FIGS. 6A-6C are explanatory views of an instruction code format according to a third embodiment of the present invention.

FIGS. 6A-6C are explanatory views of an instruction code format according to a third embodiment of the present invention. FIG. 6A shows a basic instruction code, FIG. 6B shows an example of an instruction code before compression, and FIG. 6C shows an example of an instruction code after compression. In FIGS. 6A-6C, the same components as in FIGS. 1A-1D are denoted by the same reference numerals.

While the instruction code format of the first embodiment is for three or more consecutive instructions add having the same upper 16 bits, an instruction code before compression in FIG. 6B includes two kinds of instruction 1d having the same upper 16 bits, which are not consecutive, and instructions add. Accordingly, the instruction code format of the first embodiment can not be employed. Even for such a case, the third embodiment allows compression of the second and subsequent instructions.

As shown in FIG. 6A, in the third embodiment an instruction code includes a basic instruction code of a basic format 1B and a compression format 2B. In the basic format 1B, one instruction consists of one word of 32 bits. Of the upper 16 bits of the 32 bits, 8 bits are assigned to an operational code OPCODE and the remaining 8 bits are assigned to an operand OPR1 and so on. The lower 2 bits of the lower 16 bits are assigned to a reuse flag R and a buffer number B, respectively, and the remaining 14 bits are assigned to an operand OPR2 and so on.

The reuse flag R is the same as the reuse flag R in the first and second embodiments. The buffer number B is for designating the number of instruction buffers conserving or saving the content of the upper 16 bits of the instruction code, in order to use the content as the upper 16 bits of the instruction code of the compression format 2A to be executed later. In other words, although only one instruction buffer is provided in the first and second embodiments, a plurality (2 in this case) of instruction buffers is provided in the third embodiment.

On the other hand, in the compression format 2B, 16 bits of an upper bit group and 16 bits of a lower bit group are each assigned with a reuse flag R and a buffer number B, and the operand OPR2 of the remaining 14 bits and so on. For the compression format 2B, since the upper 16 bits of the previous instruction code is reused, the reuse flags R of the upper bit group and the lower bit group are all "1" and the buffer number B indicates the number (0 or 1) of the instruction buffers that store instruction codes of the upper 16 bits to be reused.

In the instruction compression method of FIGS. 6A-6C, such an assumption is made that the upper 16 bits of the second instruction 1d out of the instruction codes before compression of FIG. 6B are stored in the first instruction buffer, and the upper 16 bits of the third instruction add are stored in the second instruction buffer. Thus, the buffer number B of the second instruction 1d is set to "0", and the buffer number B of the third instruction add is set to "1", respectively.

In the fourth instruction 1d, in order to reuse the upper 16 bits of the second instruction 1d stored in the first instruction buffer, the upper 16 bits are deleted, and then the buffer number B is set to "0" while the reuse flag R is set to "1". In the fifth instruction add, in order to reuse the upper 16 bits of the third instruction add stored in the second instruction buffer, the upper 16 bits are deleted, the buffer number B is set to "1" and the reuse flag R is set to "1". The fourth and fifth lower 16 bits are combined to produce one instruction code of the compression format 2B. Likewise, the sixth and seventh instruction codes are combined to produce one instruction code of the compression format 2B. In this example, 8 instruction codes are compressed into 6 instruction codes.

Figure 7:
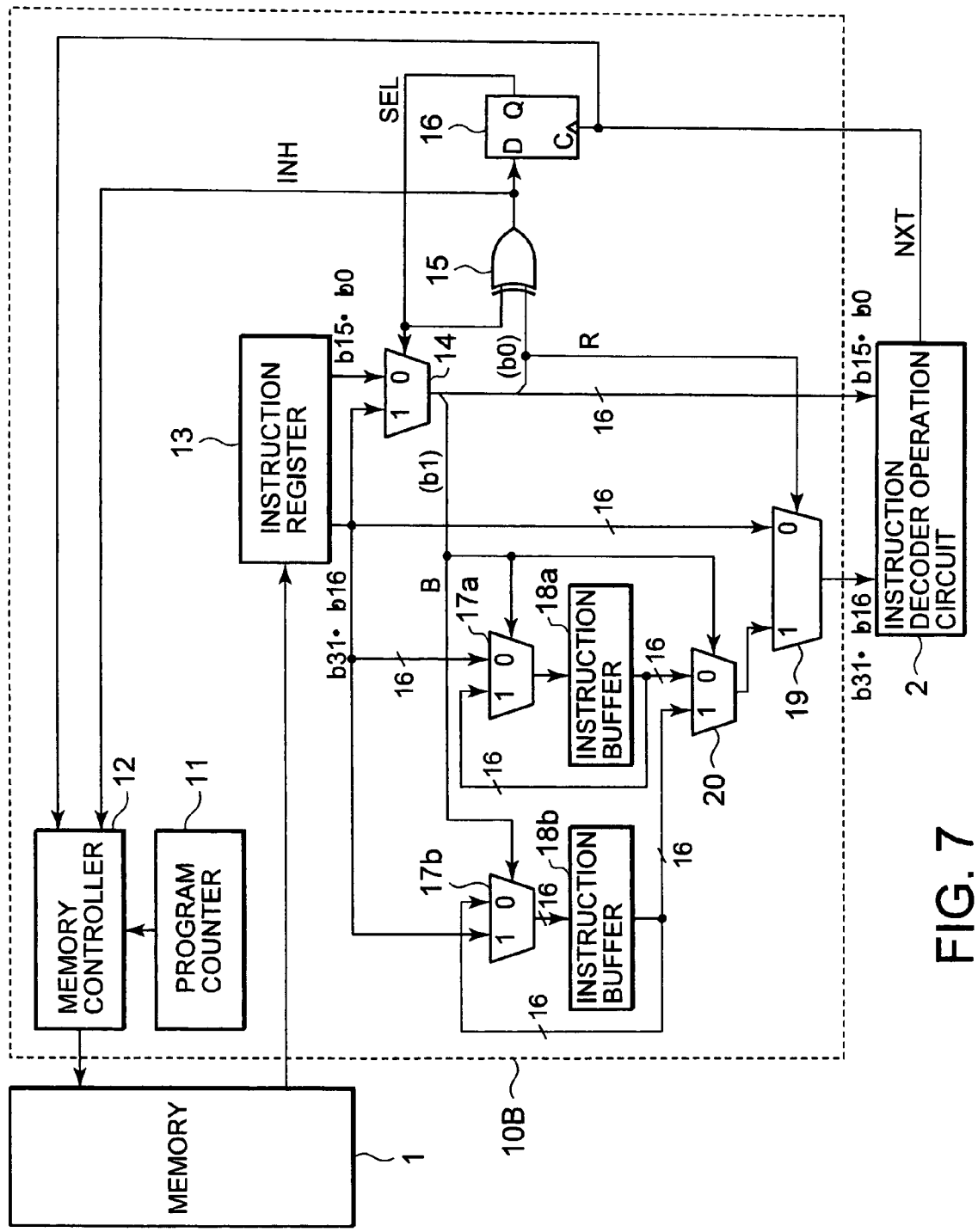
FIG. 7 is a view showing a configuration of an instruction fetch circuit corresponding to an instruction code in accordance with the third embodiment.

FIG. 7 is a view showing a configuration of an instruction fetch circuit corresponding to the instruction code in accordance with the third embodiment. In this figure, the same components as in the instruction fetch circuit 10 in FIG. 2 are denoted by the same reference numerals. An instruction fetch circuit 10B in FIG. 7 reads an instruction code compressed by the compression method of FIGS. 6A-6C that is stored in the memory 1, and converts the instruction code of the compression format 2B to the instruction code of the basic format 1B. The instruction code of the basic format 1B is provided to the instruction decoder operation circuit 2.

The instruction fetch circuit 10B in FIG. 7 includes two sets of selectors 17a and 17b and two sets of instruction buffers 18a and 18b, instead of the selector 17 and the instruction buffer 18 in the instruction fetch circuit 10 of FIG. 2. Instruction fetch circuit 10B further includes a selector 20 that selects output signals of the instruction buffer 18a and 18b.

The upper 16 bits b31 to b16 of the instruction register 13 are connected to an input terminal 0 of the selector 17a and an input terminal 1 of the selector 17b. Output terminals of the selectors 17a and 17b are connected to input sides of the instruction buffers 18a and 18b, respectively. An output side of the instruction buffer 18a is connected to an input terminal 0 of the selector 20, and an input terminal 1 of the selector 17a. An output side of the instruction buffer 18b is connected to an input terminal 1 of the selector 20, and an input terminal 0 of the selector 17b. These selectors 17a, 17b and 20 are controlled based on a value of the buffer number B of the lower 16 bits selected by the selector 14, such that a signal output from the selector 20 is provided to an input terminal 1 of selector 19. The remaining configuration of instruction fetch circuit 10B is the same as that shown in FIG. 5.

Next, a fetch operation of the instruction code after compression of FIG. 6C by the instruction fetch circuit 10B will be described. The first instruction 1d of the basic format 1B read by fetch during a first cycle is stored in the instruction register 13. Since the reuse flag R of this instruction 1d is "0", the lower 16 bits of the instruction 1d stored in the instruction register 13 are selected by the selector 14 and provided to the instruction decoder operation circuit 2. The upper 16 bits of the instruction 1d stored in the instruction register 13 are selected by the selector 19 and provided to the instruction decoder operation circuit 2.

On the other hand, since the buffer number B of the instruction 1d is "0", the upper 16 bits of the instruction 1d stored in the instruction register 13 are selected by the selector 17a and stored in the instruction buffer 18a. Thus, the content held in the instruction buffer 18a becomes the upper 16 bits of the first instruction 1d. The content held in the instruction buffer 18b is selected by the selector 17b and is restored.

The second instruction 1d read by fetch during a second cycle has the same operation as that at the first cycle, since the reuse flag R and the buffer number B are "0".

The third instruction add read by fetch during a third cycle is directly provided to the instruction decoder operation circuit 2 since the reuse flag R is "0". However, since the buffer number B is "1", the upper 16 bits of the instruction add are selected by the selector 17b and stored in the instruction buffer 18b. At this time, the content of the instruction register 18a is not updated. Thus, the upper 16 bits of the second and third instruction codes are stored in the instruction register 18a and 18b, respectively.

The fourth instruction code of the compression format 2B read by fetch during a fourth cycle is stored in the instruction register 13. Since the reuse flag R of this instruction code is "1", the read inhibition signal INH becomes "1". An output signal of the selector 20 is selected by the selector 19. On the other hand, since the buffer number B of "0" is provided as a select signal to the selector 20, the upper 16 bits of the second instruction 1d stored in the instruction buffer 18a are provided to the instruction decoder operation circuit 2 via the selectors 20 and 19 along with the lower 16 bits of the third instruction code of the compression format 2B.

In fetch at a fifth cycle, since the read inhibition signal INH is "1", a read operation from the memory 1 by the memory controller 12 is not performed. Instead, the upper 16 bits of the instruction register 13 are selected by the selector 14 and are provided to the instruction decoder operation circuit 2 along with the upper 16 bits of the third instruction add stored in the instruction buffer 18b designated by the buffer number B of "1". At this time, the read inhibition signal INH becomes "0" by a toggling operation by EXOR gate 15 and the FF 16.

In fetch during a sixth cycle, the fifth instruction code of the compression format 2B is stored in the instruction register 13, and then the same operation is repeated.

As described above, the instruction code format of the third embodiment has the buffer number B for designating the plurality (2 in this example) of instruction buffers. Accordingly, if a plurality of instruction codes having the same upper 16 bits is present, by setting buffer numbers B corresponding to respective instruction codes, these instruction codes can be integrated into one compression format by combining the lower 16 bits of the second and subsequent consecutive instruction codes into the unit of two. Accordingly, even when a plurality of kinds of instruction codes are present, it is possible to reduce program codes stored in memory 1 and the number of fetches to read the program codes.

Figures 8A, 8B:
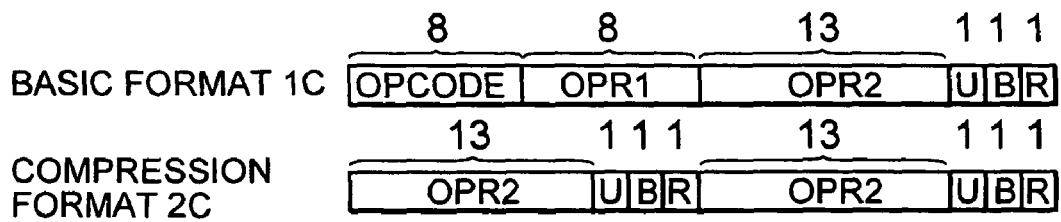
FIGS. 8A and 8B are explanatory views of an instruction code format according to a fourth embodiment of the present invention.

FIGS. 8A and 8B are explanatory views of an instruction code format according to a fourth embodiment of the present invention. FIG. 8A shows a basic instruction code, and FIG. 8B shows an example of a compression method of instruction code. In FIGS. 8A and 8B, the same components as in FIGS. 4 and 6 are denoted by the same reference numerals.

As shown in FIG. 8A, in the fourth embodiment an instruction code includes a basic instruction code of a basic format 1C and a compression format 2C. The basic format 1C is a combination of the basic formats 1A and 1B in FIGS. 4 and 6. In the basic format 1C, one instruction consists of one word of 32 bits. Of the upper 16 bits of the 32 bits, 8 bits are assigned to an operational code OPCODE, and the remaining 8 bits are assigned to an operand OPR1 and so on. The lower 3 bits of the lower 16 bits are assigned to a reuse flag R, a buffer number B and an update flag U, respectively, and the remaining 13 bits are assigned to an operand OPR2 and so on. The reuse flag R is the same as the reuse flag R in the first to third embodiments. The update flag U is the same as the update flag U in the second embodiment. The buffer number B is the same as the buffer number B in the third embodiment.

On the other hand, in the compression format 2C shown in FIG. 8A, 16 bits of an upper bit group and 16 bits of a lower bit group are each assigned with a reuse flag R, buffer number B and update flag U, and the operand OPR2 of the remaining 13 bits and so on. For the compression format 2C, since the upper 16 bits of the previous instruction code is reused, the reuse flags R of the upper bit group and the lower bit group are all "1", the buffer number B indicates the number (0 or 1) of the instruction buffers that store instruction codes of upper 16 bits to be reused, and the update flag U is "0".

Figure 9:
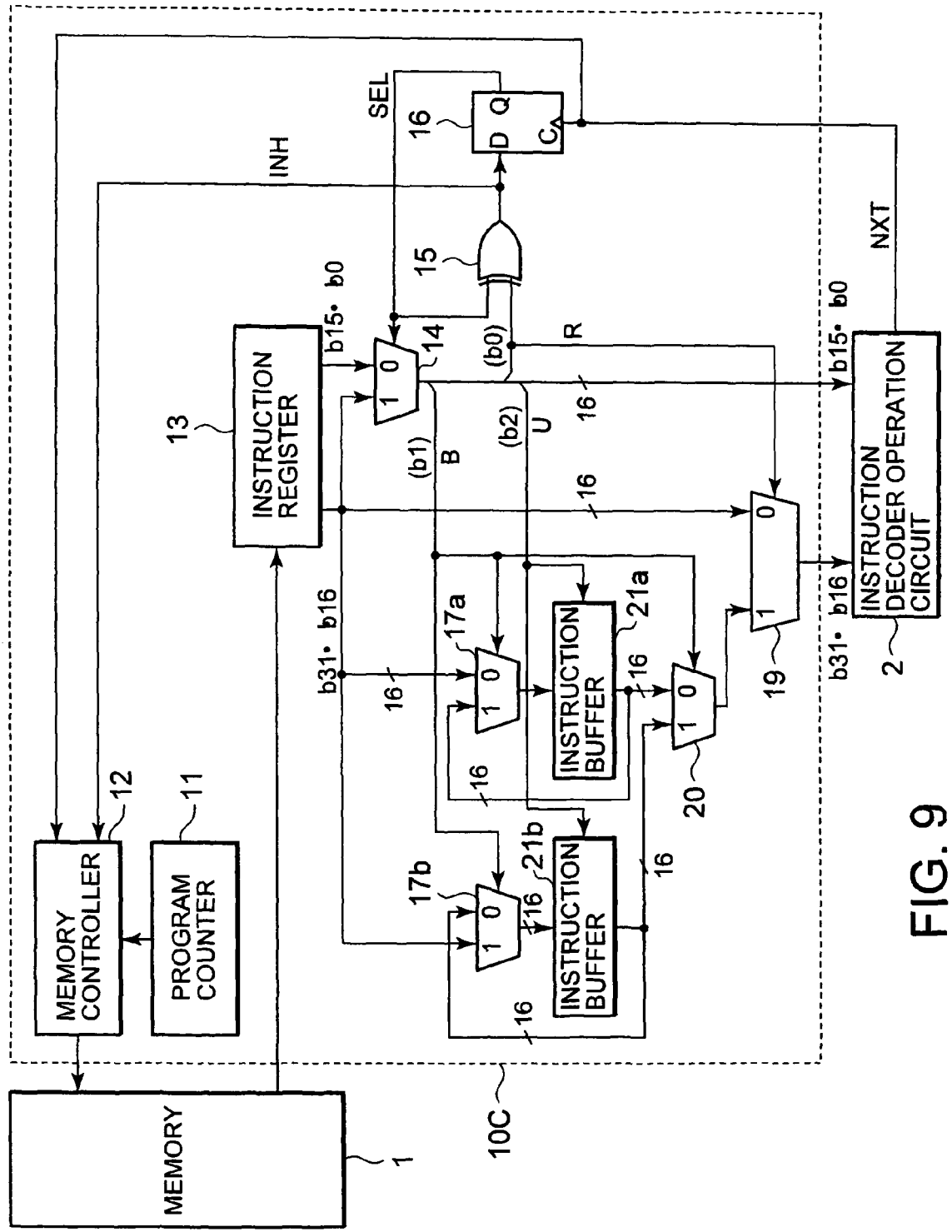
FIG. 9 is a view showing a configuration of an instruction fetch circuit corresponding to an instruction code in accordance with the fourth embodiment.

FIG. 9 is a block diagram showing a configuration of an instruction fetch circuit corresponding to the instruction code in accordance with the fourth embodiment. In this figure, the same components as in instruction fetch circuit 10B of FIG. 7 are denoted by the same reference numerals. An instruction fetch circuit 10C reads an instruction code compressed by the compression method of FIGS. 8A and 8B that is stored in memory 1, and converts the instruction code of the compression format 2C to the instruction code of the basic format 1C. The converted instruction code of the basic format 1C is then provided to instruction decoder operation circuit 2.

The instruction fetch circuit 10C shown in FIG. 9 employs instruction buffers 21a and 21b, which are controlled as to whether or not an input signal is held therein according to the update flag U (bit b2) of the lower 16 bits selected by the selector 14. Instruction buffers 21a and 21b are used instead of the instruction buffers 18a and 18b in the instruction fetch circuit 10B of FIG. 7. That is to say, owing to the described configuration, if the update flag U is "1", output signals of the selectors 17a and 17b are held in the instruction buffers 21a and 21b, respectively, and the contents held in the instruction buffers 21a and 21b are updated. Further, if the update flag U is "0", the output signals of the selectors 17a and 17b are not held in the instruction buffers 21a and 21b, and accordingly the contents held in the instruction buffers 21a and 21b are not updated. The remaining configuration of instruction fetch circuit 10c is identical with that of FIG. 7.

The instruction fetch circuit 10C performs both functions of the instruction fetch circuit 10A of FIG. 5 and the instruction fetch circuit 10B of FIG. 7. In other words, if an instruction code fetched from memory 1 and stored in the instruction register 13 has the basic format 1C, the instruction code is directly output to the instruction decoder operation circuit 2. If the update flag U is "1", the upper 16 bits of the instruction code are held in an instruction buffer 21a or 21b as designated by the buffer number B.

On the other hand, if an instruction code fetched from the memory 1 and stored in the instruction register 13 has the compression format 2C, the lower 16 bits of the compression format 2C are first selected by the selector 14 and are output to the instruction decoder operation circuit 2 along with the upper 16 bits held in instruction buffer 21a or 21b designated by the buffer number B. Next, the upper 16 bits of the compression format 2C are selected by the selector 14 and are output to the instruction decoder operation circuit 2 along with the upper 16 bits held in instruction buffer 21a or 21b as designated by the buffer number B. Thereafter, a next instruction code is fetched from the memory 1.

As described above, since the instruction code format of the fourth embodiment is a combination of the instruction code formats in the second and third embodiments, the fourth embodiment has advantages of both of the second and third embodiments.

Figures 10A, 10B, 10C:
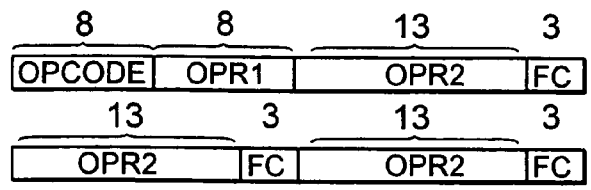
FIGS. 10A-10C are explanatory views of an instruction code format according to a fifth embodiment of the present invention.

FIGS. 10A-10C are explanatory views of an instruction code format according to a fifth embodiment of the present invention. FIG. 10A shows a basic instruction code, FIG. 10B shows an example of a flag code, and FIG. 10C shows an example of a compression method of instruction code. In FIGS. 10A-10C, the same components as in FIG. 8 are denoted by the same reference numerals.

As shown in FIG. 10A, in the fifth embodiment an instruction code includes a basic instruction code of a basic format 1D and a compression format 2D. The basic format 1D includes a flag code FC of 3 bits, instead of the reuse flag R, the buffer B and the update flag U in the basic format 1C of FIG. 8. Likewise, the compression format 2D includes a flag code FC of 3 bits, instead of the reuse flag R, the buffer B and the update flag U in the compression format 2C of FIG. 8.

As shown in FIG. 10B, the flag code FC is obtained by coding a combination of the reuse flag R, the buffer B and the update flag U. This coding allows selecting three kinds of buffer numbers B ("0", "1" and "2" in this case) with the flag code FC of 3 bits, for example.

Figure 11:
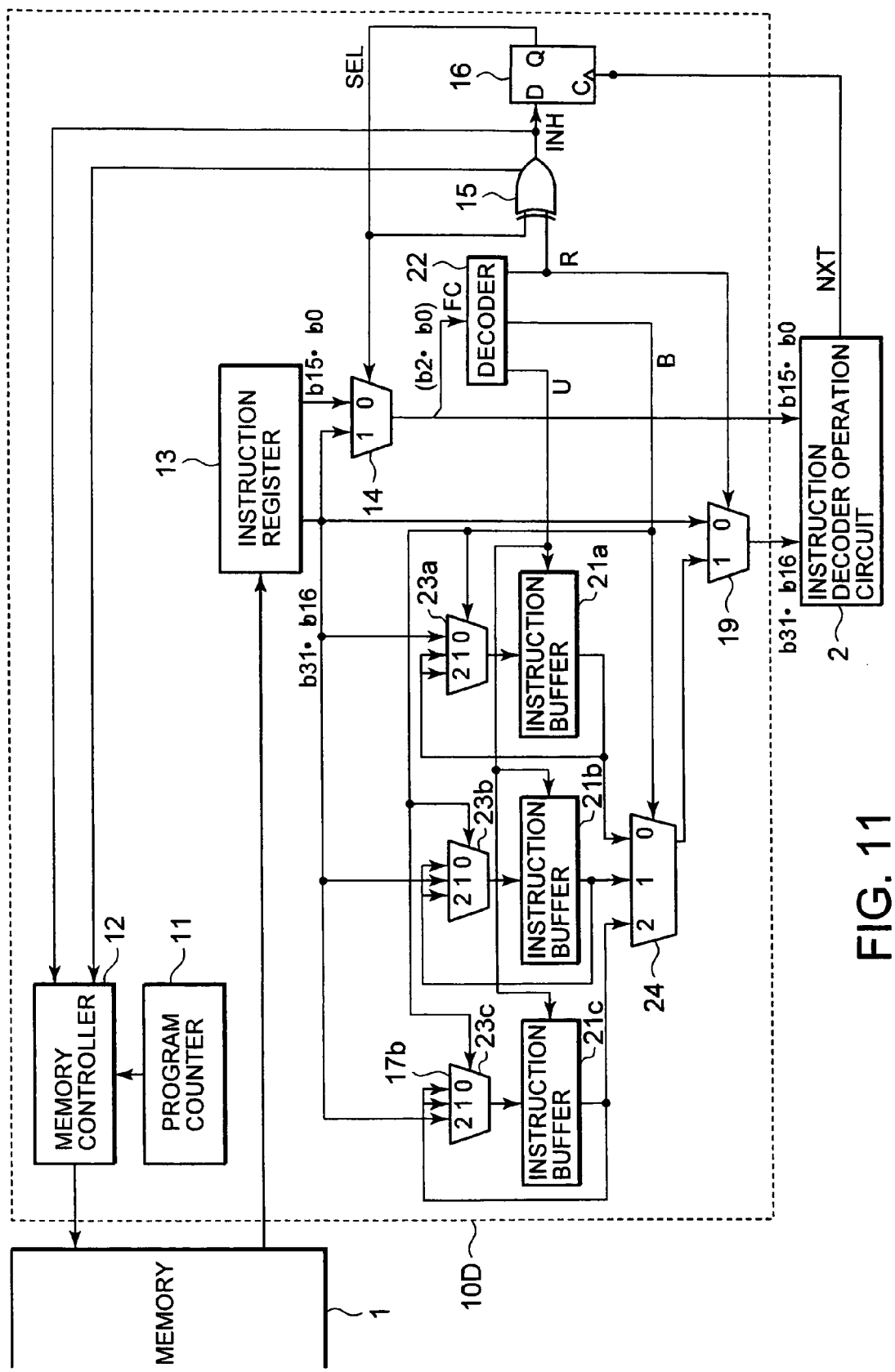
FIG. 11 is a view showing a configuration of an instruction fetch circuit corresponding to an instruction code in accordance with the fifth embodiment.

FIG. 11 is a view showing a configuration of an instruction fetch circuit corresponding to the instruction code in accordance with the fifth embodiment. In this figure, the same components as in the instruction fetch circuit 10C of FIG. 9 are denoted by the same reference numerals. Instruction fetch circuit 10D reads an instruction code compressed by the compression method of FIGS. 10A-10C that is stored in memory 1, and converts the instruction code of the compression format 2D to the instruction code of the basic format 1D. The converted instruction code in the basic format 1D is then provided to instruction decoder operation circuit 2.

The instruction fetch circuit 10D shown in FIG. 11 is provided with a decoder 22 that decodes the flag code FC (b2 to b0) in the lower 16 bits selected by the selector 14, and outputs the reuse flag R, the buffer number B and the update flag U. In addition, the instruction fetch circuit 10D is provided with three sets of selectors 23a, 23b and 23c and instruction buffers 21a, 21b and 21c, instead of the selectors 17a, 17b and 20, and the instruction buffers 21a and 21b of FIG. 9, and a selector 24 for correspondence to the three kinds of buffer numbers B.

The selector 23a selects the upper 16 bits of the instruction register 13 when the buffer number B is designated to "0" and selects an output signal of the instruction buffer 21a when the buffer number B is designated to a value other than "0". The instruction buffer 21a holds an output signal of the selector 23a when the update flag U is "1". The selector 23b selects the upper 16 bits of the instruction register 13 when the buffer number B is designated to "1" and selects an output signal of the instruction buffer 21b when the buffer number B is designated to a value other than "1". The instruction buffer 21b holds an output signal of the selector 23b when the update flag U is "1". The selector 23c selects the upper 16 bits of the instruction register 13 when the buffer number B is designated to "2" and selects an output signal of the instruction buffer 21c when the buffer number B is designated to a value other than "2". The instruction buffer 21c holds an output signal of the selector 23c when the update flag U is "1".

The selector 24 selects output signals of the instruction buffers 21a to 21c based on the buffer number B. An output signal of the selector 24 is provided to an input terminal 1 of the selector 19. The remaining configuration of the instruction fetch circuit 10D in FIG. 11 is the same as in FIG. 9.

The instruction fetch circuit 10D has the same operation as the instruction fetch circuit 10C of FIG. 9, except that the flag code FC of the instruction code stored in the instruction register 13 is decoded by the decoder 22 to output the reuse flag R, the buffer B and the update flag U, and the upper 16 bits of the respective instruction codes are held in the three instruction buffers 21*a* and 21*c* in correspondence to the three kinds of buffer numbers B.

As will be understood from the foregoing, since the instruction code format of the fifth embodiment has the flag code FC obtained by coding the combination of the reuse flag R, the buffer B and the update flag U, it is possible to cope with a large number of instruction buffers with less number of bits. Hence, such a merit can be enjoyed that the number of instruction buffers may be increased, and as a result, an increase in a compression ratio of an instruction code can be attained more than that obtained by the fourth embodiment.

Figures 12A, 12B:
FIGS. 12A and 12B are explanatory views of an instruction code format according to a fifth embodiment of the present invention.

FIGS. 12A and 12B are explanatory views of an instruction code format according to a sixth embodiment of the present invention. FIG. 12A shows a basic instruction code, and FIG. 12B shows an example of a flag code.

As shown in FIG. 12A, in the sixth embodiment an instruction code includes a basic instruction code of a basic format 1E and a compression format 2E. The basic format 1E is an instruction code of 32 bits including an operational code OPC of 8 bits, operands OP0 to OP4 each having 4 bits, and a flag code FC of 4 bits. The compression format 2E includes flag codes FC each having 4 bits in the upper 16 bits and the lower 16 bits, and an operational code OPC and operands OP0 to OP4 arranged in the remaining 12 bits according to a set number which will be described below. FIG. 12A shows an example of two kinds of compression formats 2E.

As shown in FIG. 12B, the flag code FC is obtained by coding an combination of a reuse flag R, a set number S and an update flag U. The reuse flag R and the update flag U are the same as those in the fifth embodiment. On the other hand, the set number S designates the kind of combination of 16 bits consisting of the operational code OPC and the operands OP0 to OP4. In this example, the set number 0 corresponds to a combination of the operational code OPC and the operands OP0 and OP1, the set number 1 corresponds to a combination of the operational code OPC and the operands OP0 and OP2, and the set number 2 corresponds to a combination of the operands OP0, OP1, OP2 and OP4.

FIG. 13 is an explanatory view for explaining an example of application of an instruction code of FIG. 12. In the example of FIG. 13, since an operational code OPC and operands OP0 and OP2 of the second and third instructions 1*dpi* are the same as those of the first instruction 1*dpi*, these operational code and operands are deleted. In addition, since operands OP0, OP1, OP2 and OP4 of the sixth instruction mulb are the same as those of the fourth instruction mult, these operands are deleted. Moreover, since an operational code OPC and operands OP0 and OP1 of the seventh instruction stpi are the same as those of the fifth instruction stpi, these operational code and operands are deleted.

Thus, since the second, third, sixth and seventh instruction codes each have 16 bits, an instruction code of the compression format 2E is produced by combining the second and third instruction codes. In addition, an instruction code of the compression format 2E is produced by combining the sixth and seventh instruction codes. Accordingly, in this example, seven instruction codes can be compressed into five instruction codes.

Figure 14:
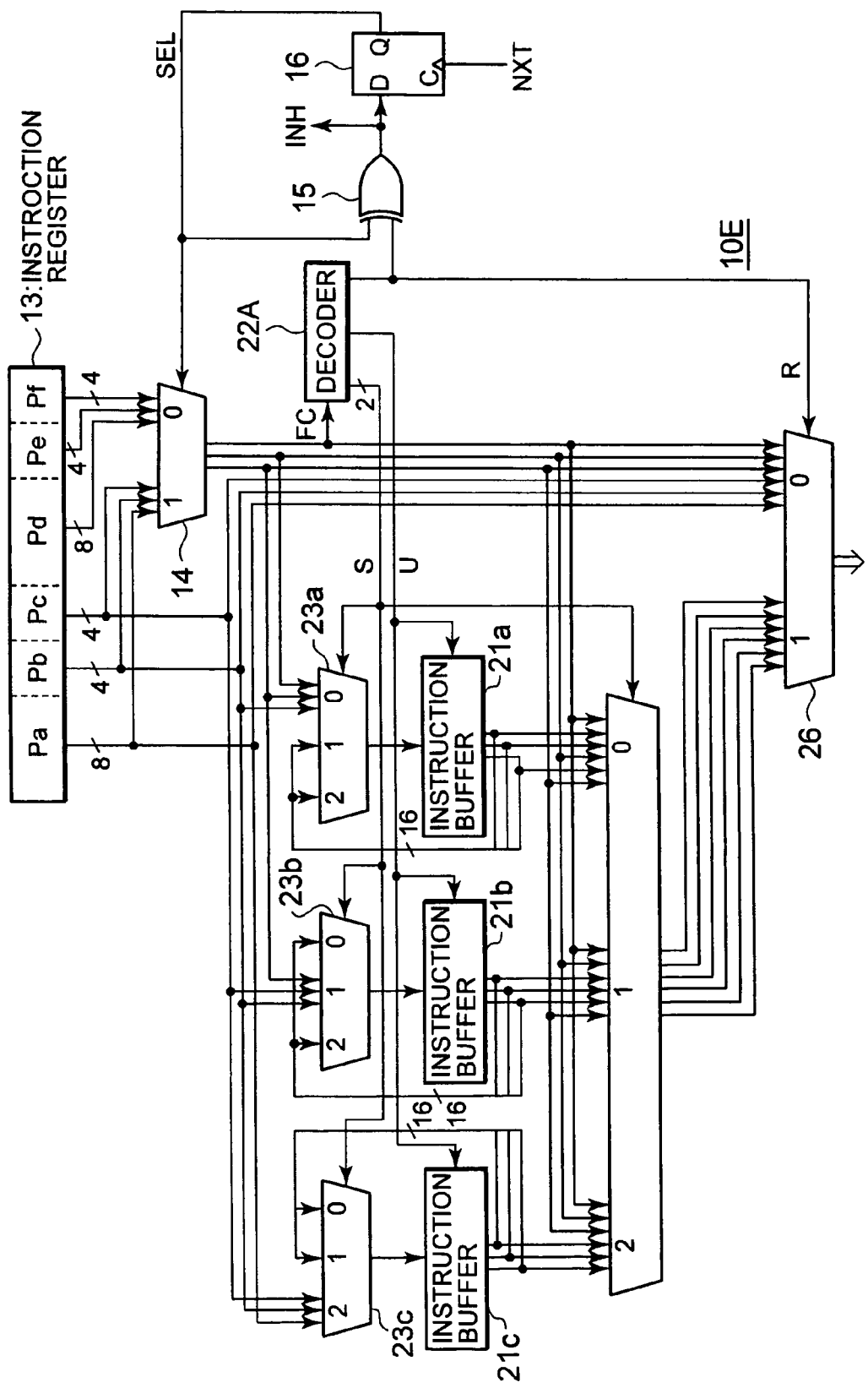
FIG. 14 is a view showing a configuration of an instruction fetch circuit corresponding to an instruction code in accordance with the sixth embodiment.

FIG. 14 is a view showing a configuration of an instruction fetch circuit corresponding to an instruction code in accordance with the sixth embodiment. In this figure, the same components as in the instruction fetch circuit 10D in FIG. 11 are denoted by the same reference numerals. Instruction fetch circuit 10E reads an instruction code compressed by the compression method of FIGS. 12A, 12B and 13 that is stored in memory 1, and converts the instruction code of the compression format 2E to the instruction code of the basic format 1E. The converted instruction code in the basic format 1E is then provided to instruction decoder operation circuit 2.

The instruction fetch circuit 10F is provided with a decoder 22A that decodes the flag code FC in the lower 16 bits selected by the selector 14, and outputs the reuse flag R, the set number S and the update flag U. Decoder 22A is provided instead of the decoder 22 in FIG. 11. The decoded set number S is provided as a control signal for the selectors 23*a*, 23*b* and 23*c*.

Although the upper 16 bits of the instruction register 13 are provided in common to the selectors 23*a*, 23*b* and 23*c* in FIG. 11, the instruction fetch circuit 10E divides a 32-bit signal of the instruction register 13 into partial codes Pa to Pf according to an operational code and operands, rearranges the partial codes according to the set number S, and provides the rearranged partial codes to the selectors 23*a*, 23*b* and 23*c*.

On the other hand, in addition to output signals of the instruction buffers 21*a* to 21*c*, the partial codes Pa to Pf selected by the selector 14 are provided to an input side of the selector 25 to select the output signals of the instruction buffers 21*a* to 21*c* according to the set number S. Thus, an instruction code of the basic format 1E recovered according to the set number S is output from the selector 25. An output signal of the selector 25 is provided to an input terminal 1 of a selector 26. The instruction code of the basic format 1E stored in the instruction register 13 is directly provided to an input terminal 0 of the selector 26, so that the input terminal 0 is selected when the reuse flag R is "0" and the input terminal 1 is selected when the reuse flag R is "1".

The instruction fetch circuit 10E divides the instruction code stored in the instruction register 13 into partial codes Pa to Pf, rearranges the partial codes according to the set number S, and provides the rearranged partial codes to the selectors 23*a* to 23*c*. On the other hand, the flag code FC in the instruction code stored in the instruction register 13 is decoded by the decoder 22A to produce a set number S as a control signal for the selectors 23*a* to 23*c* and 25. Thus, the partial codes Pa to Pf of a combination corresponding to the set number S are output from the selector 25.

As described above, since the instruction code format of the sixth embodiment has the flag code FC produced by coding the set number S in order to conserve the content of the lower 16 bits of the instruction code as well as the content of the upper 16 bits in the instruction buffer for reuse thereof in addition to the advantage of the fifth embodiment, the sixth embodiment has another advantage of increasing of the number of reusable instruction codes and hence increasing a compression ratio of an instruction code as compared to the fifth embodiment.

The above described embodiments of the present invention may be modified in various ways, and should not be limited by the above embodiments. For example, the following modifications can be provided.

(a) Although the instruction code has 32 bits in the above embodiments, the bit number may be random. Also, the bit number assigned to the operational code, the operands and the flags may be random.

(b) The number of instruction buffers is not limited to 1 to 3. Further increase of the number of instruction buffers can lead to further increase of a compression ratio of an instruction code.

What is claimed is:

1. An instruction code compression method for reducing a number of instruction codes in a computer, the computer including an operation circuit that sequentially decodes and executes instruction codes composed of an upper bit group including operational codes, and a lower bit group including operands and having a same number of bits as the upper bit group, wherein reuse flags are provided in the lower bit group, and wherein, when 2N+1 (N is an integer of 1 or more) instruction codes having a same upper bit group continues in a series of instruction codes, respective reuse flags of the lower bit group of a 2n-th (n is an integer of 1 or more and N or less) instruction code and a (2n+1)-th instruction code in the series of instruction codes are set, and the lower bit groups of the 2n-th and (2n+1)-th instruction codes are integrated into one compressed instruction code.

2. An instruction code compression method for reducing a number of instruction codes in a computer, the computer including an operation circuit that sequentially decodes and executes instruction codes composed of an upper bit group including operational codes, and a lower bit group including operands and having a same number of bits as the upper bit group, wherein reuse flags and update flags are provided in the lower bit group, and wherein, when 2N+1 (N is an integer of 1 or more) instruction codes having a same upper bit group continues in a series of instruction codes and second and subsequent instruction codes are consecutive in units of two, an update flag of a first instruction code is set, and wherein respective reuse flags of the lower bit group of a 2n-th (n is an integer of 1 or more and N or less) instruction code and a (2n+1)-th instruction code in the consecutive second and subsequent instruction codes are set, and the lower bit groups of the 2n-th and (2n+1)-th instruction codes are integrated into one compressed instruction code.

3. An instruction code compression method for reducing a number of instruction codes in a computer, the computer including an operation circuit that sequentially decodes and executes instruction codes composed of an upper bit group including operational codes, and a lower bit group including operands and having a same number of bits as the upper bit group, wherein reuse flags and n-bit buffer number setting regions are provided in the lower bit group, wherein, when the upper bit group has $2^n$ kinds of repeated same instruction codes in a series of instruction codes, values of the n-bit buffer number setting regions are set depending on a kind of the $2^n$ kinds of instruction codes, and respective reuse flags of second and subsequent instruction codes are set, and wherein, whenever two of the $2^n$ kinds of instruction codes after the second instruction code are consecutive, the lower bit group is integrated into one compressed instruction code.

4. An instruction code compression method for reducing a number of instruction codes in a computer, the computer including an operation circuit that sequentially decodes and executes instruction codes composed of an upper bit group including operational codes, and a lower bit group including operands and having a same number of bits as the upper bit group, wherein reuse flags, update flags and n-bit buffer number setting regions are provided in the lower bit group, wherein, when the upper bit group has $2^n$ kinds of same instruction codes in a series of instruction codes, update flags of respective first instruction codes in the $2^n$ kinds of same instruction codes are set, and buffer numbers corresponding to the n-bit buffer number setting regions are set, and wherein, whenever two of second and subsequent instruction codes including the $2^n$ kinds of instruction codes are consecutive, reuse flags of the two consecutive instruction codes are set, and the lower bit group is integrated into one compressed instruction code.

5. An instruction code compression method for reducing a number of instruction codes in a computer, the computer including an operation circuit that sequentially decodes and executes instruction codes composed of an upper bit group including operational codes, and a lower bit group including operands and having a same number of bits as the upper bit group, wherein reuse flags, update flags and flag code regions as a coded combination of buffer numbers are provided in the lower bit group, wherein, when the upper bit group has a plurality of same instruction codes in a series of instruction codes, update flags of respective first instruction codes in the plurality of same instruction codes are set, buffer numbers corresponding to the respective first instruction codes are set, flag codes are produced based on a combination of the set update flags and the buffer numbers, and the produced flag codes are written in flag code regions of respective instruction codes, and wherein, when second and subsequent instruction codes corresponding to the buffer numbers are consecutive, the corresponding buffer numbers and reuse flags are set, flag codes are produced based on a combination of the set buffer numbers and reuse flags, the produced flag codes are written in flag code regions of respective instruction codes, and for each of two consecutive instruction codes, the lower bit group is integrated into one compressed instruction code.

6. An instruction code compression method for reducing the number of instruction codes in a computer, the computer including an operation circuit that sequentially decodes and executes instruction codes including an operational code and a plurality of operands, wherein reuse flags, update flags and flag code regions as a coded combination of a plurality of set numbers are provided in respective instruction codes, wherein, when a plurality of instruction codes including a same combination pattern of operational code or operands is present in a series of instruction codes, an update flag of a first instruction code including the same combination pattern is set, a set number corresponding to the same combination pattern is set, a flag code is produced by coding the set update flag and the set number, and the produced flag code is written in flag code regions, wherein respective update flags of second and subsequent instruction codes including the same combination pattern are set, a set number corresponding to the combination pattern is set, a flag code is produced by coding the set update flags and the set number, and the produced flag code is written in flag code regions of respective instruction codes, and wherein, for each of two consecutive instruction codes after the second instruction code, the operands and the flag codes except for the same combination pattern are integrated into one compressed instruction code.

7. An instruction fetch circuit that sequentially reads a basic instruction code composed of an upper bit group including operational codes, and a lower bit group including operands and reuse flags and having a same number of bits as the upper bit group, and a compression instruction code in which, when 2N+1 (N is an integer of 1 or more) instruction codes having a same upper bit group continues in a series of instruction codes, respective reuse flags of the lower bit group of a 2n-th (n is an integer of 1 or more and N or less) instruction code and a (2n+1)-th instruction code in the series of instruction codes are set, and the lower bit groups of the 2n-th and (2n+1)-th instruction codes are integrated, and that provides the read basic instruction code and the read compression instruction code to an instruction decoder, the instruction fetch circuit comprising:

an instruction register that holds the basic instruction code or the compression instruction code read from a memory;

a first selector that selects an upper bit group or a lower bit group held in the instruction register according to a select signal, and that provides the selected upper bit group or lower bit group to the instruction decoder as a lower bit group of the instruction code;

an instruction buffer that holds the upper bit group held in the instruction register;

a second selector that selects a content of the instruction buffer when a reuse flag of the lower bit group selected by the first selector and provided to the instruction decoder is set, selects the upper bit group held in the instruction register when the reuse flag is not set, and provides the selected upper bit group to the instruction decoder as an upper bit group of the instruction code; and a select signal generating unit that generates the select signal to alternately select the upper bit group and the lower bit group held in the instruction register when a reuse flag of the lower bit group selected by the first selector and provided to the instruction decoder is set.

8. An instruction fetch circuit that sequentially reads a basic instruction code composed of an upper bit group including operational codes and a lower bit group including operands, reuse flags and update flags and having a same number of bits as the upper bit group, and a compression instruction code in which, when 2N+1 (N is an integer of 1 or more) instruction codes having a same upper bit group continues in a series of instruction codes and second and subsequent instruction codes are consecutive in units of two, an update flag of a first instruction code is set, and respective reuse flags of the lower bit group of a 2n-th (n is an integer of 1 or more and N or less) instruction code and a (2n+1)-th instruction code in the consecutive second and subsequent instruction codes are set, and the lower bit groups of the 2n-th and (2n+1)-th instruction codes are integrated, and that provides the read basic instruction code and the read compression instruction code to an instruction decoder, the instruction fetch circuit comprising:

an instruction register that holds the basic instruction code or the compression instruction code read from a memory;

a first selector that selects an upper bit group or a lower bit group held in the instruction register according to a select signal, and that provides the selected upper bit group or lower bit group to the instruction decoder as a lower bit group of the instruction code;

an instruction buffer that holds the upper bit group held in the instruction register when an update flag of the lower bit group selected by the first selector and provided to the instruction decoder is set;

a second selector that selects a content of the instruction buffer when a reuse flag of the lower bit group selected by the first selector and provided to the instruction decoder is set, selects the upper bit group held in the instruction register when the reuse flag is not set, and provides the selected upper bit group to the instruction decoder as an upper bit group of the instruction code; and a select signal generating unit that generates the select signal to alternately select the upper bit group and the lower bit group held in the instruction register when a reuse flag of the lower bit group selected by the first selector and provided to the instruction decoder is set.

9. An instruction fetch circuit that sequentially reads a basic instruction code composed of an upper bit group including operational codes, and a lower bit group including operands, reuse flags and buffer number setting regions and having a same number of bits as the upper bit group, and a compression instruction code in which, when instruction codes having same upper bit groups including first and second operational codes in a series of instruction codes are repeated in units of two, a buffer number corresponding to the instruction code including the second operational code is set in the buffer number setting regions, respective reuse flags of second and subsequent instruction codes are set, and for each of two consecutive instruction codes including the first and second operational codes after the second instruction code, the lower bit group is integrated, and that provides the read basic instruction code and the read compression instruction code to an instruction decoder, the instruction fetch circuit comprising:

an instruction register that holds the basic instruction code or the compression instruction code read from a memory;

a first selector that selects an upper bit group or a lower bit group held in the instruction register according to a select signal, and that provides the selected upper bit group or lower bit group to the instruction decoder as a lower bit group of the instruction code;

a first instruction buffer that holds the upper bit group including the first operational code output from the instruction register;

a second instruction buffer that holds the upper bit group including the second operational code output from the instruction register;

a second selector that selects a content of the first or second instruction buffers based on the buffer number set in the buffer number setting regions of the lower bit group selected by the first selector and provided to the instruction decoder;

a third selector that selects an output of the second selector when a reuse flag of the lower bit group selected by the first selector and provided to the instruction decoder is set, selects the upper bit group held in the instruction register when the reuse flag is not set, and provides the selected upper bit group to the instruction decoder as an upper bit group of the instruction code; and a select signal generating unit that generates the select signal to alternately select the upper bit group and the lower bit group held in the instruction register when a reuse flag of the lower bit group selected by the first selector and provided to the instruction decoder is set.

10. An instruction fetch circuit that sequentially reads a basic instruction code composed of an upper bit group including operational codes, and a lower bit group including operands, reuse flags, buffer number setting regions and update flags and having a same number of bits as the upper bit group, and a compression instruction code in which, when two or more instruction codes having same upper bit groups including first and second operational codes in a series of instruction codes are present, an update flag of a first instruction code including the first and second operational codes is set, a buffer number corresponding to the buffer number setting region of the instruction code including the second operational code, respective reuse flags of second and subsequent instruction codes including the first and second operational codes are set, and for each of two consecutive instruction codes including the first and second operational codes after the second instruction code, the lower bit group is integrated, and that provides the read basic instruction code and the read compression instruction code to an instruction decoder, the instruction fetch circuit comprising:

an instruction register that holds the basic instruction code or the compression instruction code read from a memory;

a first selector that selects an upper bit group or a lower bit group held in the instruction register according to a select signal, and that provides the selected upper bit group or lower bit group to the instruction decoder as a lower bit group of the instruction code;

a first instruction buffer that holds the upper bit group including the first operational code output from the instruction register when an update flag of the lower bit group selected by the first selector and provided to the instruction decoder is set;

a second instruction buffer that holds the upper bit group including the second operational code output from the instruction register when an update flag of the lower bit group selected by the first selector and provided to the instruction decoder is set;

a second selector that selects a content of the first or second instruction buffer based on the buffer number set in the buffer number setting regions of the lower bit group selected by the first selector and provided to the instruction decoder;

a third selector that selects an output of the second selector when a reuse flag of the lower bit group selected by the first selector and provided to the instruction decoder is set, selects the upper bit group held in the instruction register when the reuse flag is not set, and provides the selected upper bit group to the instruction decoder as an upper bit group of the instruction code; and a select signal generating unit that generates the select signal to alternately select the upper bit group and the lower bit group of the instruction register when a reuse flag of the lower bit group selected by the first selector and provided to the instruction decoder is set.

11. An instruction fetch circuit that sequentially reads a basic instruction code composed of an upper bit group including operational codes, and a lower bit group including operands and a flag code region as a coded combination of a plurality of instruction buffer numbers, reuse flags and update flags and having a same number of bits as the upper bit group, and a compression instruction code in which, when a plurality of instruction codes having a same upper bit groups including different operational codes in a series of instruction codes is present, an update flag of a first instruction code including the operational codes is set, an instruction buffer number corresponding to the instruction code including the operational codes is set, respective reuse flags of second and subsequent instruction codes including the operational codes are set, a flag code as a coded combination of the set reuse flag, instruction buffer number and update flag is produced, the produced flag code is written in the flag code region of each instruction code, and for each of two consecutive instruction codes after the second instruction code, the lower bit group is integrated, and that provides the read basic instruction code and the read compression instruction code to an instruction decoder, comprising:

an instruction register that holds the basic instruction code or the compression instruction code read from a memory;

a first selector that selects an upper bit group or a lower bit group held in the instruction register according to a select signal, and provides the selected upper bit group or lower bit group to the instruction decoder as a lower bit group of the instruction code;

a decoder that decodes the flag code region of the lower bit group selected by the first selector and outputs the reuse flag, the plurality of instruction buffer numbers and the update flags;

a plurality of instruction buffers that holds the upper bit group including the operational codes output from the instruction register according to instruction buffer numbers when the update flag is set;

a second selector that selects and outputs the content of the plurality of instruction buffers based on the instruction buffer number;

a third selector that selects an output of the second selector when the reuse flag is set, selects the upper bit group of the instruction register when the reuse flag is not set, and provides the selected upper bit group to the instruction decoder as an upper bit group of the instruction code; and a select signal generating unit that generates the select signal to alternately select the upper bit group and the lower bit group held in the instruction register when the reuse flag is set.

12. An instruction fetch circuit that sequentially reads instruction codes in which flag code regions as a coded combination of reuse flags, update flags and set numbers are provided in respective instruction codes, when a plurality of instruction codes including a same combination pattern of operational code or operands is present in a series of instruction codes, an update flag of a first instruction code including the same combination pattern is set, a set number corresponding to the same combination pattern is set, a flag code is produced by coding the set update flag and set number, the produced flag code is written in flag code regions, respective update flags of second and subsequent instruction codes including the same combination pattern are set, a set number corresponding to the same combination pattern is set, a flag code is produced by coding the set update flags and set number, the produced flag code is written in flag code regions of respective instruction codes, and for each of two consecutive instruction codes after the second instruction code, the operands and the flag codes except for the same combination pattern are integrated into one compressed instruction code, and provides the instruction codes to an instruction decoder, the instruction fetch circuit comprising:

an instruction register that holds the instruction codes read from a memory;

a decoder that decodes the flag code region of the instruction codes held in the instruction register and outputs the reuse flag, the plurality of set numbers and the update flags;

a plurality of instruction buffers that hold the instruction codes output from the instruction register according to the combination pattern based on the set numbers when the update flag is set;

a first selector that selects and outputs the content of the plurality of instruction buffers based on the set numbers;

a second selector that selects an output of the first selector when the reuse flag is set, selects the instruction register when the reuse flag is not set, and provides the instruction code to the instruction decoder; and a select signal generating unit that generates the select signal to alternately select the upper bit group and the lower bit group of the instruction register when the reuse flag is set.

* * * * *